(12) United States Patent
Chow et al.

(10) Patent No.: US 10,887,638 B2
(45) Date of Patent: *Jan. 5, 2021

(54) PROCESSING AND DISTRIBUTION OF VIDEO-ON-DEMAND CONTENT ITEMS

(71) Applicant: AT&T INTELLECTUAL PROPERTY I, L.P., Atlanta, GA (US)

(72) Inventors: Lee M. Chow, Naperville, IL (US); David Piepenbrink, Chicago, IL (US); Stephen Rys, Austin, TX (US); James T. Sofos, Aurora, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 60 days.

This patent is subject to a terminal disclaimer.

(21) Appl. No.: 16/058,790

(22) Filed: Aug. 8, 2018

(65) Prior Publication Data

US 2018/0352279 A1 Dec. 6, 2018

Related U.S. Application Data

(63) Continuation of application No. 14/718,177, filed on May 21, 2015, now Pat. No. 10,075,752, which is a
(Continued)

(51) Int. Cl.
*H04N 21/262* (2011.01)
*H04N 21/4627* (2011.01)
(Continued)

(52) U.S. Cl.
CPC ... *H04N 21/26208* (2013.01); *H04N 21/2347* (2013.01); *H04N 21/252* (2013.01);
(Continued)

(58) Field of Classification Search
CPC .. H04N 21/251; H04N 21/252; H04N 21/258; H04N 21/25808; H04N 21/25841;
(Continued)

(56) References Cited

U.S. PATENT DOCUMENTS 5,619,247 A 4/1997 Russo
5,790,935 A 8/1998 Payton
(Continued)

FOREIGN PATENT DOCUMENTS

WO 2009141269 A1 11/2009

*Primary Examiner* — James R Sheleheda
(74) *Attorney, Agent, or Firm* — Guntin & Gust, PLC; Ralph Trementozzi (57) ABSTRACT

A method includes encrypting, at a server, a media content item to form encrypted content. The method includes determining, at the server, a group of media devices associated with users that are likely to request the media content item. The method includes multicasting, without receiving a related request for the media content item from a media device of the group, the encrypted content and information from the server to the group of media devices. The information includes a usage period of the encrypted content. The method includes, receiving, at the server during the usage period, an acceptance notice of an offer for the media content item from a media device of the group of media devices. The method also includes sending, from the server to the media device, a decryption key for the encrypted content responsive to the acceptance notice.

20 Claims, 6 Drawing Sheets

Related U.S. Application Data continuation of application No. 12/640,206, filed on Dec. 17, 2009, now Pat. No. 9,071,875.

(51) Int. Cl.
  *H04N 21/6405* (2011.01)
  *H04N 21/2347* (2011.01)
  *H04N 21/258* (2011.01)
  *H04N 21/25* (2011.01)
  *H04N 21/472* (2011.01)

(52) U.S. Cl.
  CPC . *H04N 21/25841* (2013.01); *H04N 21/25883* (2013.01); *H04N 21/25891* (2013.01); *H04N 21/4627* (2013.01); *H04N 21/47202* (2013.01); *H04N 21/6405* (2013.01)

(58) Field of Classification Search
  CPC ....... H04N 21/25866; H04N 21/25883; H04N 21/25891; H04N 21/262; H04N 21/26208; H04N 21/26233; H04N 21/26241
  See application file for complete search history.

(56) References Cited

U.S. PATENT DOCUMENTS

| | | | |
|---|---|---|---|
| 5,966,371 A * | 10/1999 | Sherman | H04B 7/18513 370/320 |
| 5,978,381 A | 11/1999 | Perlman et al. | |
| 6,460,180 B1 | 10/2002 | Park et al. | |
| 7,178,161 B1 | 2/2007 | Fristoe et al. | |
| 7,237,032 B2 | 6/2007 | Gemmell | |
| 7,340,759 B1 | 3/2008 | Rodriguez | |
| 7,349,921 B2 | 3/2008 | Hirstius et al. | |
| 7,539,306 B2 * | 5/2009 | Ohta | G06F 21/10 380/201 |
| 7,697,557 B2 * | 4/2010 | Segel | H04L 67/104 370/429 |
| 8,156,529 B2 | 4/2012 | Alexander | |
| 8,752,099 B2 * | 6/2014 | Riedl | H04N 21/6168 725/87 |
| 9,021,535 B2 * | 4/2015 | Britt | H04N 21/4788 725/93 |
| 9,043,827 B1 * | 5/2015 | Rapoport | H04N 7/163 725/31 |
| 9,071,875 B2 * | 6/2015 | Chow | H04N 21/25841 |
| 10,075,752 B2 * | 9/2018 | Chow | H04N 21/25841 |
| 2002/0055942 A1 | 5/2002 | Reynolds | |
| 2002/0083456 A1 | 6/2002 | Bates et al. | |
| 2002/0120927 A1 | 8/2002 | Harada et al. | |
| 2002/0133830 A1 * | 9/2002 | Kim | H04N 7/17318 725/142 |
| 2003/0005454 A1 * | 1/2003 | Rodriguez | G06Q 30/0601 725/89 |
| 2003/0061624 A1 * | 3/2003 | Wennerstrom | G11B 27/034 725/151 |
| 2004/0139024 A1 * | 7/2004 | So | G06Q 20/401 705/51 |
| 2006/0218604 A1 | 9/2006 | Riedl et al. | |
| 2006/0277181 A1 * | 12/2006 | Temple | H04N 7/17318 |
| 2007/0112973 A1 * | 5/2007 | Harris | H04L 67/2842 709/232 |
| 2007/0121612 A1 * | 5/2007 | Nadeau | H04L 12/2801 370/386 |
| 2007/0130585 A1 | 6/2007 | Perret et al. | |
| 2007/0174471 A1 * | 7/2007 | Van Rossum | H04L 29/06 709/229 |
| 2007/0220565 A1 | 9/2007 | Angel et al. | |
| 2007/0261088 A1 | 11/2007 | Phillips et al. | |
| 2007/0283449 A1 * | 12/2007 | Blum | H04N 21/4627 726/28 |
| 2008/0065691 A1 | 3/2008 | Suitts et al. | |
| 2008/0066125 A1 | 3/2008 | Li et al. | |
| 2008/0092181 A1 | 4/2008 | Britt | |
| 2008/0155623 A1 * | 6/2008 | Ota | H04N 21/4667 725/109 |
| 2008/0221942 A1 | 9/2008 | Agnihotri et al. | |
| 2008/0244681 A1 * | 10/2008 | Gossweiler | H04N 21/235 725/133 |
| 2009/0177760 A1 | 7/2009 | Gonzalez et al. | |
| 2009/0193486 A1 | 7/2009 | Patel et al. | |
| 2010/0159976 A1 | 6/2010 | Marocchi et al. | |
| 2010/0166394 A1 | 7/2010 | Ariyoshi et al. | |
| 2010/0205641 A1 | 8/2010 | Charania et al. | |
| 2011/0072075 A1 | 3/2011 | Gautier | |
| 2011/0154382 A1 | 6/2011 | Chow et al. | |
| 2011/0164686 A1 * | 7/2011 | Lu | H04N 21/4331 375/240.25 |
| 2011/0264551 A1 | 10/2011 | Lau | |
| 2012/0173673 A1 | 7/2012 | Dietrich et al. | |
| 2013/0170541 A1 | 7/2013 | Pace et al. | |
| 2013/0173919 A1 * | 7/2013 | Jogand-Coulomb | H04N 21/4405 713/168 |
| 2013/0318163 A1 | 11/2013 | Whitfield, Jr. et al. | |
| 2014/0109166 A1 | 4/2014 | Koreeda | |
| 2014/0289759 A1 | 9/2014 | Nakano et al. | |
| 2014/0359670 A1 * | 12/2014 | Riedl | H04N 21/47214 725/58 |

* cited by examiner

PROCESSING AND DISTRIBUTION OF VIDEO-ON-DEMAND CONTENT ITEMS

CLAIM OF PRIORITY

This application is a continuation of, and claims priority from, U.S. patent application Ser. No. 14/718,177, filed on May 21, 2015, which is a continuation of U.S. patent application Ser. No. 12/640,206, filed on Dec. 17, 2009, now U.S. Pat. No. 9,071,875, each of which is incorporated herein by reference in its entirety.

FIELD OF THE DISCLOSURE

The present disclosure is generally related to processing and distributing video-on-demand content items.

BACKGROUND

Video-on-demand (VOD) has become an increasingly popular way for service providers to offer content to customers. Typically, a customer browses available VOD items and selects a particular VOD item to watch. Upon making the selection, the VOD item is streamed to the user's set-top box (STB) from a server. The VOD item is usually transmitted to the STB via a dedicated unicast channel that is opened between the server and the STB. When multiple customers play the VOD item at the same time, multiple dedicated channels are opened, decreasing available bandwidth at the server and increasing a service provider cost of offering VOD services.

DETAILED DESCRIPTION

Systems, methods, and computer-readable media are disclosed to proactively "push" video-on-demand (VOD) content to selected groups of electronic devices (e.g., set-top boxes (STBs)) via multicast. A recommendation engine determines whether or not to push a particular VOD content item to the electronic devices in a particular group. The determination is made based on group-level characteristics and user-level characteristics, such as historical data, demographic information, user-provided preferences, and community ratings of VOD content items. When the recommendation engine determines that there is a sufficient likelihood that the particular VOD item will be ordered by the electronic devices within the particular group, the particular VOD content item is multicast to the electronic devices.

In a particular embodiment, a system includes a database configured to store group-level information associated with one or more groups of STBs. The database is also configured to store user-level information associated with individual STBs of the one or more groups of STBs. The system also includes a recommendation engine configured to determine whether to transmit a VOD content item to a particular group of STBs. The determination is based on group-level information associated with the particular group of STBs and based on user-level information associated with individual STBs of the particular group of STBs. The system further includes a network interface configured to multicast the VOD content item to each STB of the particular group of STBs. The VOD content item has an associated validity time period. Once the validity time period has elapsed, the VOD content item becomes unplayable at each STB of the particular group of STBs.

In another particular embodiment, a method includes selecting a group of electronic devices to receive a VOD content item. The selection is based on group level information associated with the group of electronic devices and based on user-level information associated with individual electronic devices of the group of electronic devices. The method also includes encrypting the VOD content item and transmitting the encrypted VOD content item to each electronic device of the group. The transmission occurs via multicast during a non-peak time period. The VOD content item has an associated validity time period, and the encrypted VOD content item is automatically deleted from each electronic device in the group when the validity time period has elapsed.

In another particular embodiment, a computer-readable medium includes instructions, that when executed by a processor, cause the processor to receive a VOD content item from a server, where the VOD content item has an associated offer time period. The instructions also cause the processor to store the VOD content item at a memory and to offer the VOD content item for purchase during the offer time period after the VOD content item is stored. The instructions further cause the processor to receive a purchase indication associated with the VOD content item and to initiate playback of the VOD content item from the memory in response to the purchase indication. The instructions cause the processor to automatically delete the VOD content item from the memory after the offer time period has elapsed.

Figure 1:
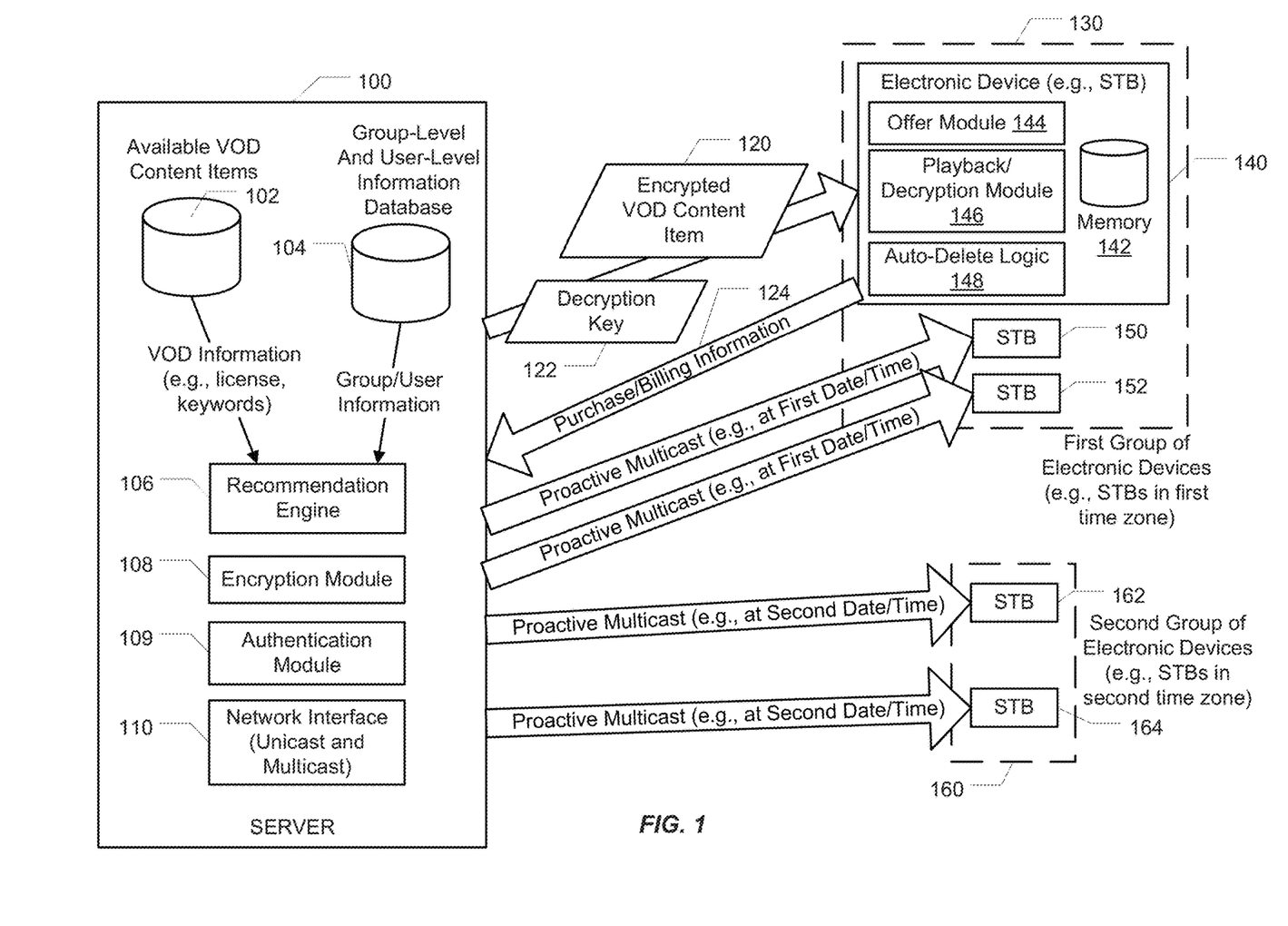
FIG. 1 is a diagram of a particular embodiment of a system of processing and distributing video-on-demand (VOD) content items.

FIG. 1 depicts a particular embodiment of a system of processing and distributing video-on-demand (VOD) content items. The system includes a server 100 communicatively coupled to a first group 130 of electronic devices and to a second group 160 of electronic devices. For example, the first group 130 may include the set-top boxes (STBs) 140, 150, and 152, and the second group 160 may include the STBs 162 and 164. It should be noted that a STB is merely one example of an electronic device. The groups 130, 160 may alternately include other types of electronic devices, such as televisions, computing devices, personal media players, mobile telephones, and other electronic devices.

The server 100 includes or has access to one or more data storage devices (e.g., disk-based storage) of available VOD content items 102. The available VOD content items 102 may include movies, television shows, sports events, interactive content, games, and other VOD content. Each of the available VOD content items 102 may have associated information such as license information and keywords (e.g., genre keywords, cast keywords, and crew keywords).

The server 100 also includes or has access to a database 104 of group-level information and user-level information, such as historical data, demographical data, user-provided preferences, and community ratings. To illustrate, the database 104 may include group-level information for each of the groups 130 and 160. The database 104 may also include user-level information associated with the STBs 140, 150, 152, 162, and 164.

A recommendation engine 106 is configured to receive VOD information associated with the available VOD content items 102 and group-level and user-level information from the database 104. Based on the received information, the recommendation engine 106 may determine whether or not to proactively push a particular VOD content item to the STBs within a particular group. For example, the recommendation engine 106 may determine that a particular VOD content item should be pushed to the first group 130, because there is a high likelihood that the pushed VOD content item will be subsequently purchased at one or more of the STBs 140, 150, and 152.

Prior to transmission, an encryption module 108 of the server 100 encrypts the VOD content item that is to be pushed. A network interface 110 is configured to transmit the VOD content item to the STBs 140, 150, 152 and 162, 164 of the groups 130 and 160, respectively. In a particular embodiment, VOD content items that are proactively pushed are transmitted by the network interface 110 via multicast, and VOD content items that are not proactively pushed (e.g., streamed upon purchase) are transmitted by the network interface 110 via unicast. For example, the encryption module 108 may generate an encrypted VOD content item 120 and the network interface 110 may proactively multicast the encrypted VOD content item 120 to the first group 130, including the STBs 140, 150, and 152 of the first group 130, as illustrated in FIG. 1.

In a particular embodiment, proactively pushed VOD content items are transmitted by the network interface 110 via a public network (e.g., the Internet). In another particular embodiment, VOD content items are transmitted directly to STBs, without storing the VOD content items at intermediate central offices. For example, the encrypted VOD content item 120 may be Internet protocol (IP) multicast to the STBs 140, 150, and 152 of the first group 130 via the Internet. The server 100 may also include an authentication module 109. The authentication module 109 may be configured to receive purchase and billing information 124 from the STB 140 and to determine that the encrypted VOD content item 120 is authorized for playback the STB 140. The authentication module 109 may trigger transmission of a decryption key 122 usable at the STB 140 to decrypt and play the encrypted VOD content item 120.

The STB 140 may include a memory 142 to store proactively pushed VOD content items. For example, upon receiving the encrypted content item 120, the STB 140 may store the encrypted content item 120 at the memory 142. The STB 140 may also include an offer module 144 configured to offer the encrypted VOD content item 120 for purchase. For example, the offer module 144 may generate a VOD graphical user interface (GUI) as described with reference to the VOD GUI 500 of FIG. 5. In a particular embodiment, the offer module 144 is further configured to transmit purchase and billing information 124 (e.g., date of purchase, time of purchase, and price of purchase) to the server 110.

The STB 140 may also include a playback and decryption module 146. For example, after the encrypted VOD content item 120 is purchased at the STB 140, the playback and decryption module 146 may request and receive the decryption key 122 from the authentication module 109, where the decryption key 122 is usable to decrypt the encrypted VOD content item 120. The playback and decryption module 146 may initiate playback of the encrypted VOD content item 120 from the memory 142 by using the decryption key 122. The modules 144, 146, 148 may be preinstalled at the STB 140. Alternately, the modules 144, 146, 148 may be downloaded (e.g., from the server 100) during an update procedure.

In a particular embodiment, each proactively pushed VOD content item has an associated offer and validity time period. For example, the encrypted VOD content item 120 may have an offer and validity time period of one week. In such an embodiment, the STB 140 may include logic to render the encrypted VOD content item 120 unplayable once the offer and validity time period has elapsed. Determining that the validity time period elapsed may include examining a validity end time of the encrypted VOD content item 120. Alternately, the determination may be made based on a timestamp of the encrypted VOD content item 120. For example, the STB 140 may include auto-delete logic 148 configured to automatically delete the encrypted VOD content item 120 from the memory 142 after the offer and validity time period has elapsed. It should be noted that deleting an item from the memory 142 or otherwise making an item at the memory 142 unplayable may not involve physically deleting the entire item. Instead, the auto-delete logic 148 may remove a file table entry of the memory 142 corresponding to the item or may mark a storage address space of the memory 142 corresponding to the item as "free." Alternately, the item may be tagged (e.g., in a "valid items list") as "expired."

It should be noted that although not specifically illustrated in FIG. 1, the STBs 150, 152, 162, and 164 may include components that function similarly to the components 142, 144, 146, and 148 of the STB 140.

In operation, the recommendation engine 106 may determine whether to proactively push a particular VOD content item to a particular group of electronic devices via multicast. For example, the recommendation engine 106 may determine that a VOD content item should be pushed to both the first group 130 of electronic devices and the second group 160 of electronic devices based on license information (e.g., release date, release time, and playback restrictions) associated with the VOD content item. The determination may also be based on group-level and user-level information associated with the groups 130, 160 and the STBs 140, 150, 152, 162, and 164 therein. The VOD content item may be encrypted by the encryption module 108, thereby producing the encrypted VOD content item 120, and the network interface 110 may multicast the encrypted VOD content item 120. In a particular embodiment, the multicast occurs during a non-peak time (e.g., a relatively low bandwidth usage time) to reduce possible effects on delivery of other television content. The non-peak time may be determined by a bandwidth monitor at the server 100.

In a particular embodiment, the encrypted VOD content item 120 may be multicast in "rolling" fashion. For example, the STBs 140, 150, and 152 of the first group 130 may be located in a first geographic location in a first time zone and may be coupled to a first central office (not shown), and the STBs 162 and 164 of the second group 160 may be located in a second geographic location in a second time zone and may be coupled to a second central office (not shown). The license information associated with the encrypted VOD content item 120 may indicate that the encrypted VOD content item 120 is to be made available at a particular date (e.g., January $1^{st}$) and particular time (e.g., 8 am). Because the first group 130 and second group 160 may be in different time zones, the encrypted VOD content item 120 may be multicast to the first group 130 at a different date and time (e.g., a first date and time) than to the second group 160 (e.g., at a second date and time). For example, if the first group 130 is in the United States eastern time zone and the second group 160 is in the United States central time zone, the encrypted VOD content item 120 may be multicast to the first group 130 an hour before the encrypted VOD content item 120 is multicast to the second group 160. Thus, in some situations, the date of VOD content delivery may be the same and only the time of VOD content delivery may vary.

Alternately, the encrypted VOD content item 120 may be multicast to both time zones at the same time, but the encrypted VOD content item 120 may include information (e.g., metadata) indicating that offers of the encrypted VOD content item 120 are not to be made at the electronic device until a particular date and time with respect to a particular time zone.

Upon receiving the encrypted VOD content item 120, the STB 140 may store the encrypted VOD content item at the memory 142. The offer module 144 may generate an offer to purchase (e.g., view) the encrypted VOD content item 120. When the offer is accepted, the offer module may send purchase and billing information 124 to the server 100. The playback and decryption module 146 may receive the decryption key 122 from the authentication module 109 and may use the decryption key 122 to decrypt and play the encrypted VOD content item 120 from the memory 120. Upon expiration of an offer and validity time period associated with the encrypted VOD content item 120, the auto-delete logic 148 may automatically delete the encrypted VOD content item 120 from the memory 142. The offer to purchase the encrypted VOD content item 120, including any related data (e.g., a movie trailer when the encrypted VOD content item 120 is a movie) may also be deleted.

It will be appreciated that the system 100 of FIG. 1 may enable provider-triggered "push" VOD, as opposed to subscriber-triggered "pull" VOD. Thus, service providers may be able to plan bandwidth requirements and reduce monetary costs associated with providing VOD content items. For example, one copy of the encrypted VOD content item 120 may be multicast to multiple STBs (as opposed to multiple copies of the encrypted VOD content item 120 being unicast to the multiple STBs), and each of the STBs may subsequently initiate a VOD purchase order for the encrypted VOD content item 120.

It will also be appreciated that the system 100 of FIG. 1 may provide subscribers with quality and pricing benefits. For example, the server 100 may be able to provide a higher quality (e.g., higher resolution, higher video bitrate, or higher audio bitrate) VOD content item via multicast than via streaming unicast. As another example, a proactively pushed VOD content item may be available for purchase at a lower price than a VOD content item that is to be streamed, because of the lower bandwidth requirement and cost associated with the proactively pushed VOD content item. In a particular embodiment, offers for VOD content items may indicate whether the items have been proactively pushed, as described with reference to FIG. 4.

Figure 2:
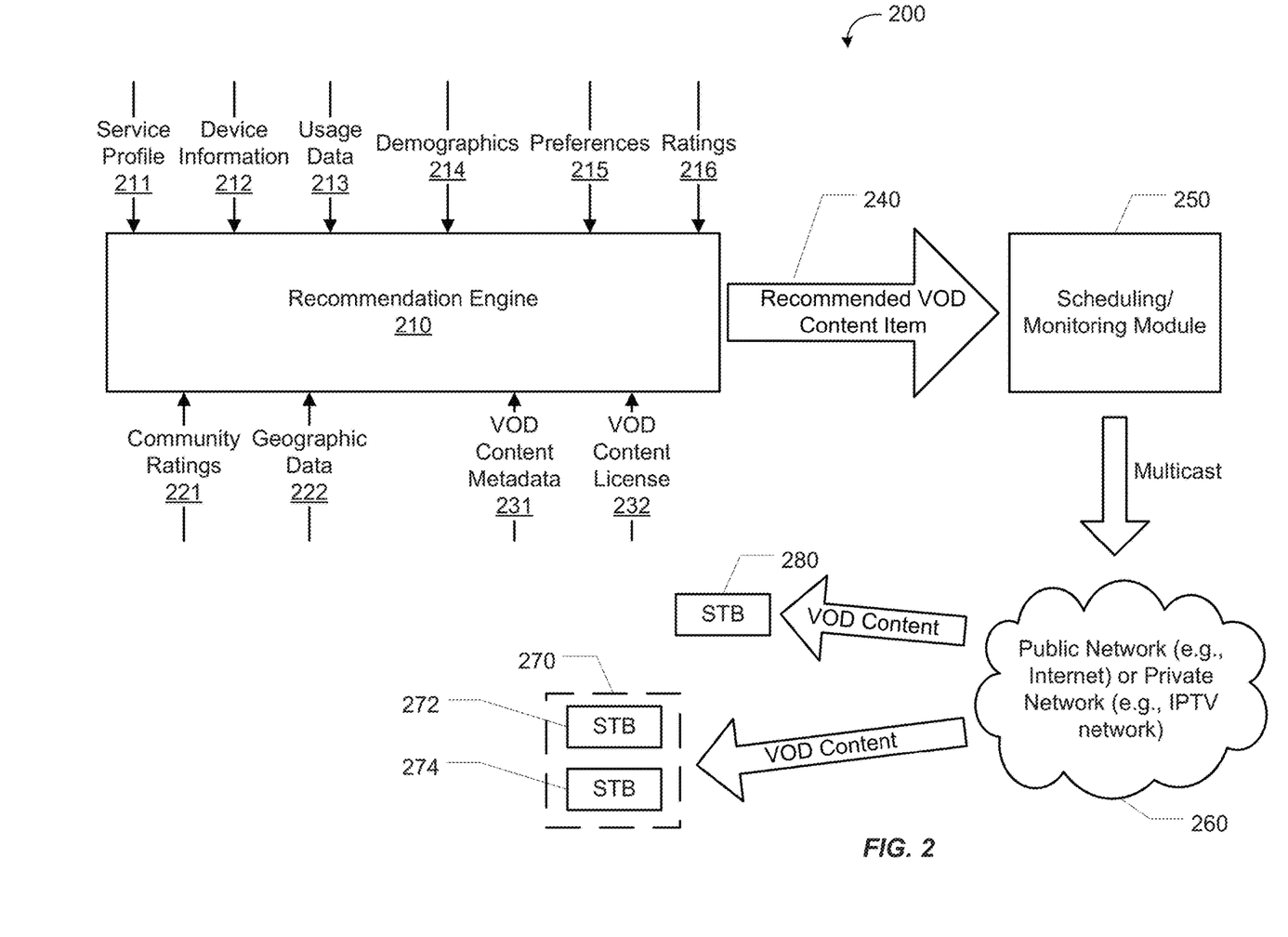
FIG. 2 is a diagram of another particular embodiment of a system of processing and distributing VOD content items.

Referring to FIG. 2 another particular embodiment of a system 200 of processing and distributing VOD content items is depicted. A recommendation engine 210 may be coupled to a scheduling and monitoring module 250. The scheduling and monitoring module 250 may be coupled to a STB 280 and to a group of STBs 270 via a network 260. The network 260 may be a public network (e.g., the Internet) or a private network (e.g., an Internet protocol television (IPTV) network). In an illustrative embodiment, the recommendation engine 210 is the recommendation engine 106 of FIG. 1.

The recommendation engine 210 may recommend that a particular VOD content item be multicast to individual electronic devices (e.g., the STB 280) or a group of electronic devices (e.g., the group of STBs 270 including the STBs 272, 274). The recommendation engine 210 may make the recommendation based on one or more of user-level (e.g., customer-level) data, group-level data, and information associated with the particular VOD content item. For example, customer-level data may include a customer service profile 211, device information 212 (e.g., whether a particular customer's STB is capable of displaying high definition content), customer usage data 213, demographic information 214, customer preferences 215, and customer rating 215 (e.g., ratings the customer has provided for other VOD content). Group-level data may include community ratings 221 (e.g., an average of customer ratings for a particular VOD content item within the group) and geographic data 222 (e.g., neighborhood, city, state, and time zone information) associated with the group. Information associated with the particular VOD content item may include VOD content metadata 231 and a VOD content license 232.

The scheduling and monitoring module 250 may be configured to multicast (e.g., IP multicast) a recommended VOD content item to individual electronic devices (e.g., the STB 280) or a group of electronic devices (e.g., the group of STBs 270) via the network 260. The scheduling and monitoring module 250 may also monitor bandwidth conditions at the network 260 to determine when (e.g., a non-peak time or a scheduled network maintenance time) to perform the multicast.

It will be appreciated that the recommendation engine 210 may perform a multi-factor analysis to determine which VOD content items are to be proactively multicast, thereby increasing a likelihood that the proactively multicast VOD content items will subsequently be purchased. It will also be appreciated that the scheduling and monitoring module 250 may reduce potential disruption of non-VOD services at the STBs 272, 274, 280 by electing to multicast the recommended VOD content items at a non-peak time or during a scheduled network maintenance time window.

Figure 3:
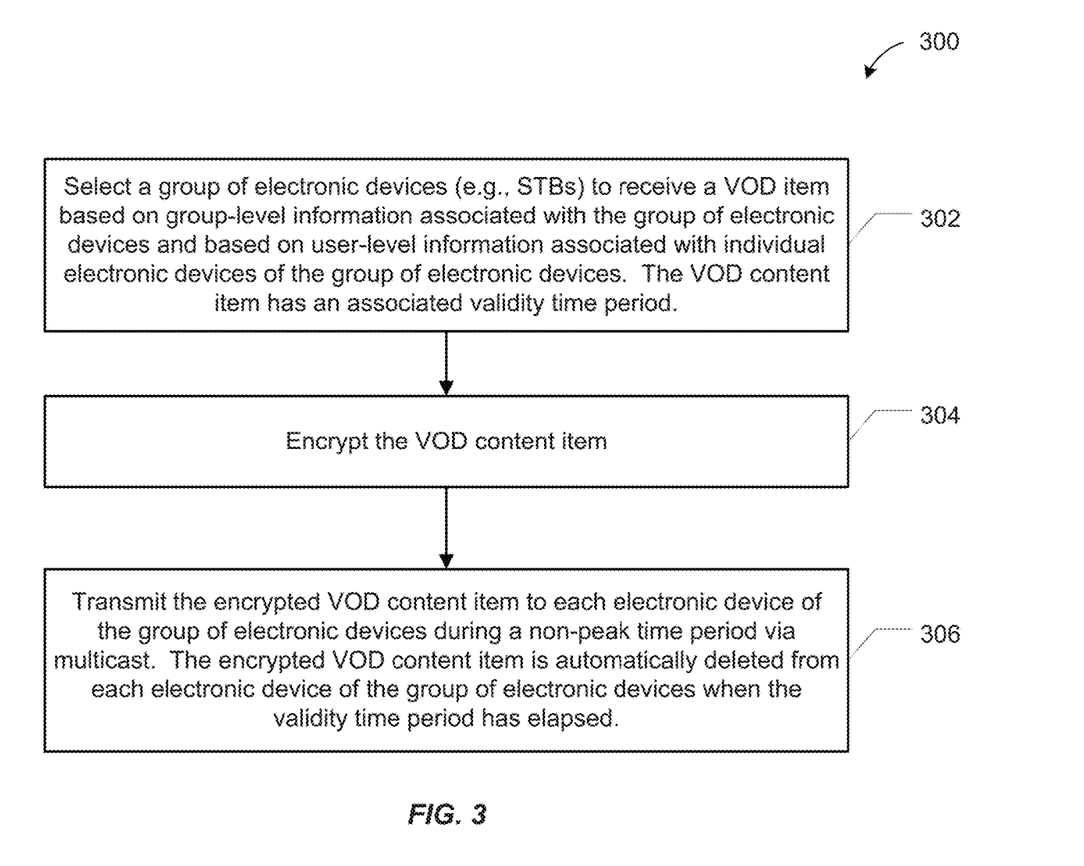
FIG. 3 is a flow diagram of a particular embodiment of a method of processing and distributing VOD content items.

Referring to FIG. 3, a particular embodiment of a method 300 of processing and distributing video on demand (VOD) content items is depicted. The method 300 may be performed at a network element, such as at a processor within the server 100 of FIG. 1.

The method 300 includes selecting a group of electronic devices (e.g. a group of set top boxes (STBs)) to receive a video-on-demand (VOD) content item, at 302. The group of electronic devices is selected based on group level information associated with the group of electronic devices and based on user-level information associated with individual electronic devices of the group of electronic devices. The VOD content item may have an associated validity time period.

The method 300 also includes encrypting the VOD content item, at 304. Encrypting the VOD content item may include digital rights management (DRM) or other methods of making the VOD content item secure against misuse, copying, or other unauthorized acts. A representative type of encryption uses encryption and decryption keys, but other types of encryption or security measures may also be used.

The method 300 further includes transmitting the encrypted VOD content item to each electronic device of the particular group of electronic devices during a non-peak time period via multicast, at 306. The VOD content item is selected and is proactively pushed to multiple electronic devices, such as by multicasting content to a group of set top box devices in a particular geographic region. In a particular embodiment, the encrypted VOD content item is automatically deleted or otherwise made unplayable at each electronic device when the validity time period has elapsed.

The selection of the VOD content item and the selection of the particular electronic devices to receive the VOD content item may be made based on one or more selection criteria. Alternatively, or in addition, the group of STBs may be selected based on a license associated with the VOD content item. The license may include a release date and time, and each electronic device of the group of electronic devices may be located within a first time zone. In this scenario, the encrypted VOD content item may be transmitted to each electronic device of the group of electronic devices at a first date and time corresponding to the release date and time with respect to the first time zone. In the event that user electronic devices are located in different time zones, the method further includes transmitting the encrypted VOD content item to each electronic device in a second group of electronic devices located within a second time zone at a second date and time corresponding to the release date and time with respect to the second time zone.

For example, in FIG. 1, the recommendation engine 106 may receive VOD information, group-level information, and user-level information, and may select a particular group of set top boxes to receive particular VOD content items. The server 100 may multicast the particular VOD content items to the selected group of set top boxes to proactively push content to the set top boxes in an attempt to forecast content items that will be found useful to users. Once the VOD content items have been multicast to the group of electronic devices (e.g. a group of STBs), the service provider may send offers to users of the electronic devices with respect to the VOD content. Alternately, the offers may be generated at the STBs. Since the VOD content items have been proactively multicast to the electronic devices, the service provider may offer higher quality content (i.e. downloaded vs. streamed video) or may offer playback of the multicast VOD content items at a reduced price as compared to other content that would require retrieval and streaming.

In a particular embodiment, the VOD content item has an associated offer and validity time period and the VOD content item is automatically deleted from each electronic device of the particular group of electronic devices when the offer and validity time period has elapsed. For example, the auto-delete logic 148 within the STB 140 may automatically delete the encrypted VOD content item 120 stored at the memory 142 upon expiration of an offer and validity time period associated with the VOD content item 120.

In another embodiment, a peer to peer network capability may be used to multicast portions of encrypted VOD content items to different electronic devices. For example, the method 300 may include transmitting the encrypted VOD content item by multicasting a first portion of the encrypted VOD content item to a first subgroup of electronic devices in the group of electronic devices and multicasting a second portion of the encrypted VOD content to a second subgroup of electronic devices in the group of electronic devices. After multicast of different portions of the encrypted VOD content item to different electronic devices or to different groups or sub-groups of electronic devices, the encrypted VOD content may be assembled and made ready for playback on a particular electronic device. For example, playing the encrypted VOD content item at an electronic device in the first subgroup may include receiving the second portion of the encrypted VOD content item from an electronic device in the second subgroup. The second portion of the encrypted VOD content item can be received at the electronic device in the first subgroup from the electronic device in the second subgroup via peer-to-peer (P2P) communication. After the second portion of the encrypted VOD content item is received, the first portion and the second portion may be combined to allow formulation and playback of the complete encrypted VOD content item.

It will be appreciated that the method 300 of FIG. 3 may enable further reduction in bandwidth used to provide VOD content items by multicasting VOD (either as complete files or in portions). It will also be appreciated that the method 300 of FIG. 3 may preserve content security and increase storage capacity at electronic devices by encrypting the multicast VOD content items and by automatically deleting the multicast VOD content items after a time period has elapsed.

Figure 4:
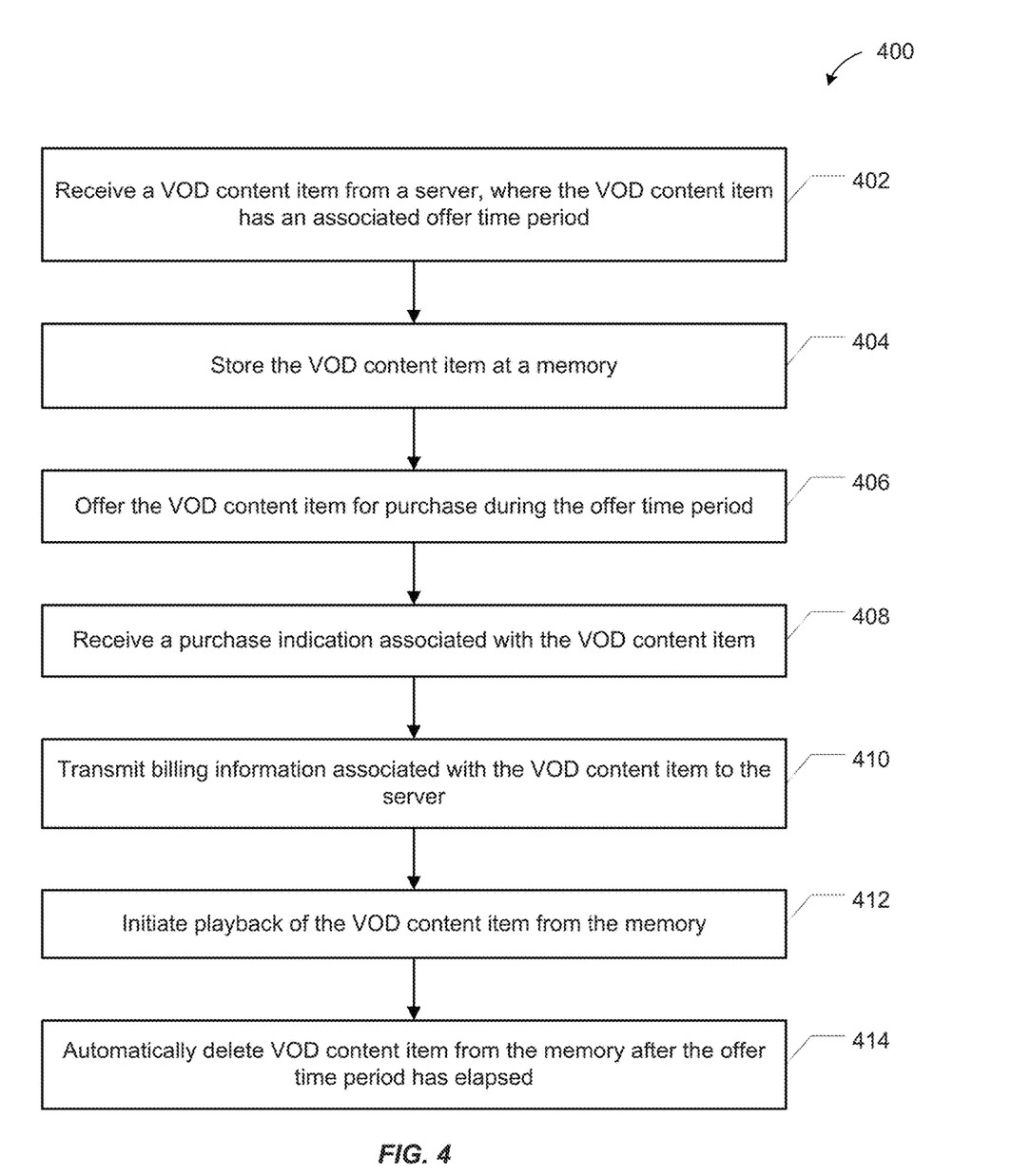
FIG. 4 is a flow diagram of a particular embodiment of a method that may be implemented by an electronic device of FIG. 1.

Referring to FIG. 4, a particular embodiment of a method 400 that may be implemented by an electronic device is shown. In an illustrative embodiment, the method 400 may be performed by an electronic device, such as the STB 140 of FIG. 1.

The method 400 includes receiving a video-on-demand (VOD) content item from a server, at 402. The VOD content item has an associated offer time period. For example, in FIG. 1, the STB 140 may receive the encrypted VOD content item 140 from the server 100.

The method 400 also includes storing the VOD content item at a memory, at 404. For example, in FIG. 1, the encrypted VOD content item 120 may be stored at the memory 142.

After storing the VOD content item, the method 400 includes offering the VOD content item for purchase during the offer time period, at 406. An example of an offer time period may be a day, a week, or a month. For example, in FIG. 1, the offer module 144 may offer the encrypted VOD 120 content item for purchase during the offer time period.

The method 400 also includes receiving a purchase indication associated with the VOD content item, at 408. For example, in FIG. 1, the STB 140 may receive an indication (e.g., via a remote control) that a user of the STB 140 desires to purchase (e.g., view) the encrypted VOD content item 120. The method 400 may also include transmitting billing information associated with the VOD content item to the server, at 410. For example, in FIG. 1, the purchase and billing information 124 may be sent to the server 120. In a particular embodiment, the billing information may include terms of the offer, the indication of acceptance of the offer, and other information for use by the server at a service provider to create a billing entry in a billing system. A user of the electronic device may receive a bill for the purchase of the VOD content item, such as via a monthly service bill from a service provider, or via a credit card bill.

The method 400 further includes initiating playback of the VOD content item from the memory in response to the purchase indication, at 412. For example, in FIG. 1, the playback and decryption module 146 may decrypt and play the encrypted VOD content item 120 from the memory 142.

After the offer time period expires or elapses, the VOD content item may automatically be deleted from the memory of an electronic device (e.g. a STB), at 414. For example, in FIG. 1, the STB 140 includes auto-delete logic 148 that may delete the encrypted VOD content item 120 from the memory 142. In a particular embodiment, purchasing a VOD content item is equivalent to renting the VOD content item for a particular time period (e.g., 24 hours). The VOD content item may be automatically deleted regardless of whether it was purchased. In another particular embodiment, purchasing a VOD content item is equivalent to acquiring ownership rights to the VOD content item. In such an embodiment, the VOD content item may not be deleted upon expiration of the offer time period. Instead, the VOD content item may be decrypted to enable repeated playback.

When the VOD content item is multicast to the electronic device prior to purchase, the offer to purchase, or rent, the VOD content item may provide an indication that the VOD content item had been proactively downloaded and stored prior to purchase. In this case, the offer may have a reduced price or other special terms that apply for the multicast VOD content item. Such special pricing or special terms may not apply to content that was not proactively multicast.

It will be appreciated that the method 400 of FIG. 4 may enable user electronic devices (e.g., STBs) to receive, offer, and play proactively multicast VOD content items. It will thus be appreciated that the method 400 of FIG. 4 may provide users of electronic devices (e.g., STBs) with higher quality VOD content at a lower price than VOD content that is streamed via unicast.

Figure 5:
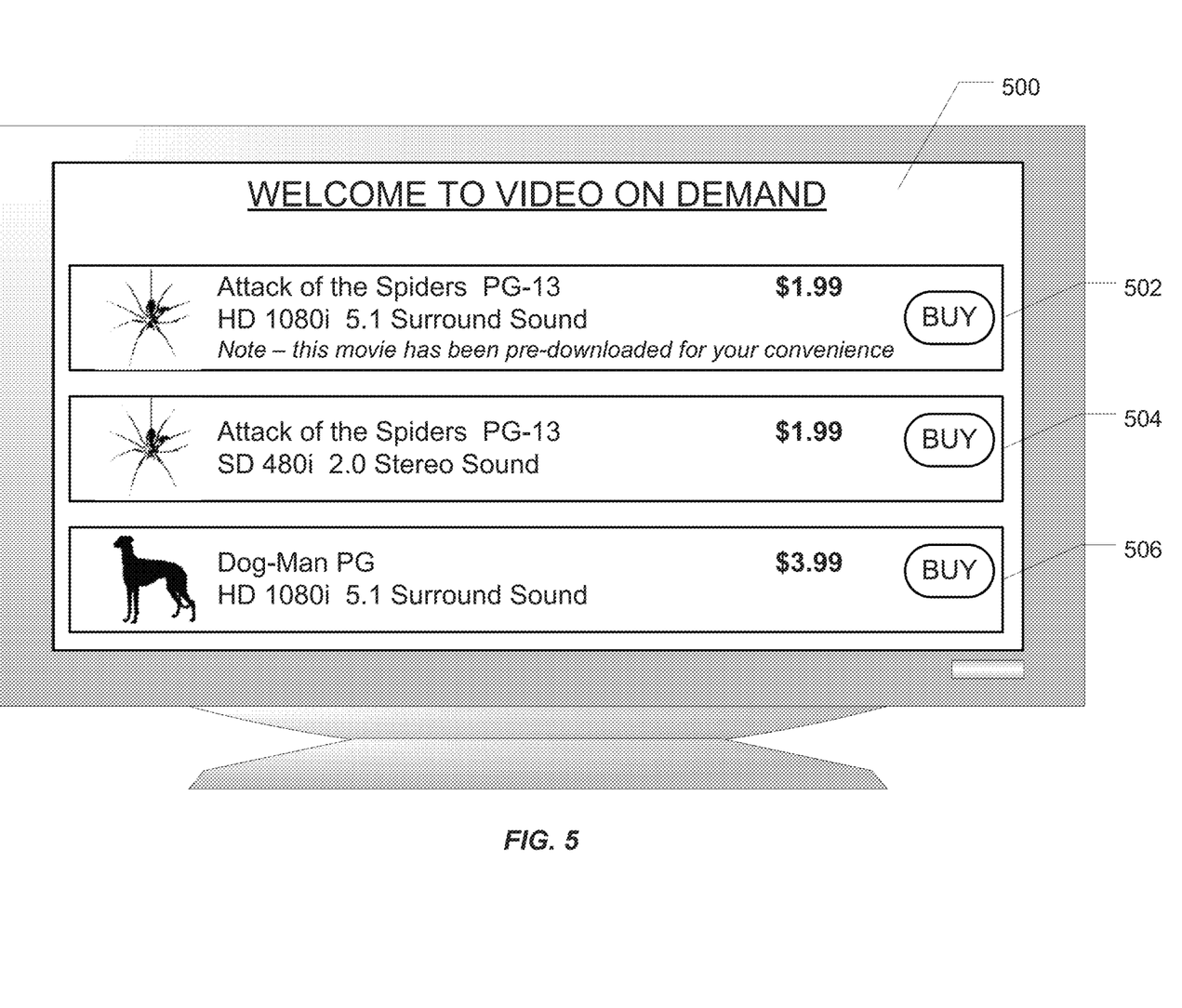
FIG. 5 is a diagram to illustrate a particular embodiment of a VOD graphical user interface.

Referring to FIG. 5, a particular embodiment of a VOD graphical user interface (GUI) 500 is depicted. In an illustrative embodiment, the VOD GUI is generated by the offer module 144 of FIG. 1.

The VOD GUI 500 may include offers to purchase one or more available VOD content items. Some of the available VOD content items may have been proactively pushed via multicast whereas other may not have been proactively pushed. The proactively pushed VOD content items may have a higher quality and/or lower price than VOD content items that have not been proactively pushed. In a particular embodiment, the VOD GUI 500 may indicate which VOD content items have been proactively pushed.

For example, in the particular embodiment illustrated in FIG. 5, the VOD GUI 500 includes three offers 502, 504, and 506 to purchase VOD content items. The first offer 502 indicates that a movie "Attack of the Spiders" is rated PG-13, has been proactively pushed (e.g., downloaded via multicast), and is available at a price of $1.99. The first offer 502 also indicates that the movie includes high definition (HD) 1080i video data and 5.1 surround sound audio data.

The second offer 504 indicates that a standard definition (SD) version of the movie "Attack of the Spiders" is also available for purchase at a price of $1.99. Thus, although the first offer 502 and the second offer 504 are associated with the same movie and have the same price, the proactively pushed version of the movie offered by the first offer 502 has a higher quality (e.g., higher resolution, higher video data bitrate, and higher audio data bitrate) than the version of the movie offered by the second offer 504.

The third offer 506 indicates that a movie "Dog-Man" is rated PG and is available at a price of $3.99. The third offer 506 also indicates that the movie includes HD 1080i video data and 5.1 surround sound audio data. Thus, although the movies offered by the first offer 502 and the second offer 504 have the same quality, the proactively pushed movie offered by the first offer 502 has a lower price.

Figure 6:
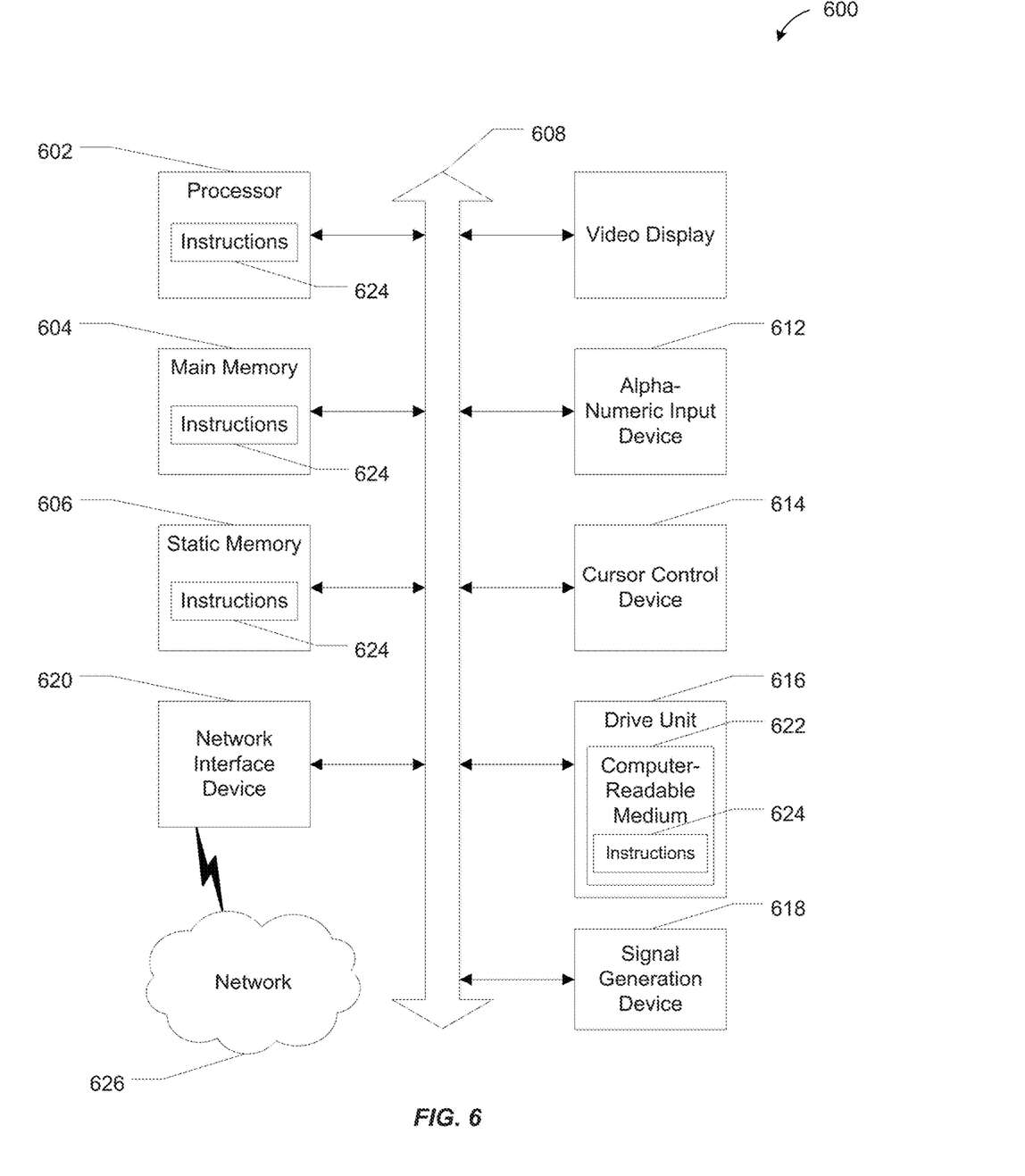
FIG. 6 is a block diagram of a particular embodiment of a general purpose computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices. In an illustrative embodiment, the computer system 600 may include or be incorporated into the server 100 of FIG. 1. In other illustrative embodiments, the computer system 600 may include or be incorporated into the STBs 140, 150, 152, 162, and 164 of FIG. 1 or the STBs 270, 272, and 274 of FIG. 2.

In a networked deployment, the computer system 600 may operate in the capacity of a server or as a client user computer in a server-client user network environment, or as a peer computer system in a peer-to-peer (or distributed) network environment. The computer system 600 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a web appliance, or any other machine capable of executing a set of instructions (sequential or otherwise) that specify actions to be taken by that machine. In a particular embodiment, the computer system 600 may be implemented using electronic devices that provide video, audio, or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 may include a main memory 604 and a static memory 606, which can communicate with each other via a bus 608. As shown, the computer system 600 may further include a video display unit 610, such as a liquid crystal display (LCD), a projection television system, a flat panel display, or a solid state display. Additionally, the computer system 600 may include an input device 612, such as a keyboard, and a cursor control device 614, such as a mouse. The computer system 600 may also include a disk drive unit 616, a signal generation device 618, such as a speaker or remote control, and one or more network interface devices 620 capable of communicating with a network 626. Not all of the components of the computer system 600 of FIG. 6 may be included. For example, some computer systems 600 may not include an input device (e.g., a server may not include an input device).

In a particular embodiment, as depicted in FIG. 6, the disk drive unit 616 may include a computer-readable storage medium 622 in which one or more sets of instructions 624, e.g. software, can be embedded. Further, the instructions 624 may embody one or more of the methods (e.g., the method 300 of FIG. 3 or the method 400 of FIG. 4) or logic (e.g., the recommendation engine 106 of FIG. 1 and the recommendation engine 210 of FIG. 2) as described herein. In a particular embodiment, the instructions 624 may reside completely, or at least partially, within the main memory 624, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable storage medium that stores instructions 624. While the computer-readable storage medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein (e.g., the method 300 of FIG. 3 at the server 100 of FIG. 1 and the method 400 of FIG. 4 at the STB 140 of FIG. 1).

In a particular non-limiting, exemplary embodiment, the computer-readable storage medium may include a solid-state memory such as a memory card or other package that houses one or more non-volatile read-only memories. Further, the computer-readable storage medium may be a random access memory or other volatile re-writable memory. Additionally, the computer-readable storage medium may include a magneto-optical or optical medium, such as a disk or tapes or other storage device. A digital file attachment to an e-mail or other self-contained information archive or set of archives may be considered equivalent to a tangible storage medium. Accordingly, the disclosure is considered to include any one or more of a computer-readable storage medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:

encrypting, at a server, an on-demand media content item in a particular format to form encrypted, on-demand media content;

determining, at the server, a group of media devices associated with users that are likely to request the on-demand media content item;

multicasting, without receiving a related request for the on-demand media content item from a media device of the group, content from the server to the group of media devices, the content including the encrypted, on-demand media content and metadata, wherein the metadata identifies a usage period of the encrypted, on-demand media content and offer information, the encrypted, on-demand media content, comprising the entirety of the on-demand media content item, stored locally by the media device, resulting in locally stored encrypted, on-demand media content;

receiving, at the server during the usage period, an acceptance notice of an offer for the on-demand media content item in the particular format from a media device of the group of media device, the offer presented by the media device based on the offer information and in response to a start time of the usage period; and sending, from the server to the media device, a decryption key for the encrypted, on-demand media content responsive to the acceptance notice, the decryption key facilitating presentation of the locally stored encrypted, on-demand media content at the media device.

2. The method of claim 1, wherein the determining the group of media devices associated with users that are likely to request the on-demand media content item includes making a determination that a particular media device is likely to request the on-demand media content item based on group-level information, based on user-level information, and based on content information associated with the on-demand media content item.

3. The method of claim 2, wherein the group-level information includes geographic data.

4. The method of claim 2, wherein the user-level information includes media device capabilities, usage data, demographic information, preferences or a combination thereof, and wherein the determining the group of media devices is further based on license information associated with the on-demand media content item, the license information comprising a release date, a release time, or playback restrictions.

5. The method of claim 1, wherein the server provides on-demand media content to devices in a second format via unicast transmission, and wherein the particular format corresponds to a higher quality of the on-demand media content item than a quality associated with the media content item delivered in the second format.

6. The method of claim 1, wherein a first price associated with the offer for the on-demand media content item in the particular format is lower than a second price for other on-demand media content in the particular format available from the server via unicast transmission.

7. The method of claim 1, wherein the offer indicates that the on-demand media content item has been downloaded to the media device.

8. The method of claim 1, wherein the multicasting of the content is performed during a non-peak usage time of a network, wherein the multicasting occurs without storing the on-demand media content at an intermediate central office, and wherein the multicasting comprises Internet protocol multicast to the group of media devices.

9. The method of claim 1, wherein the metadata enables each of the media devices of the group of media devices to free a memory used to store the encrypted, on-demand, media content after the usage period.

10. The method of claim 1, wherein a particular media device of the group of media devices comprises a set-top box device, a computer, a mobile communication device, a personal media player, or a combination thereof.

11. A system comprising:
a processing system including a processor; and
a memory coupled to the processing system, the memory including instructions, that when executed by the processing system facilitate performance of operations, the operations including:
receiving content from a server, the content including metadata and an encrypted version of a video-on-demand, media content item in a particular format, wherein the content is not received in response to a request for the video-on-demand, media content item, and wherein the metadata indicates a usage period associated with the encrypted version and includes offer information;
storing the encrypted version of the video-on-demand, media content item comprising the entirety of the on-demand, media content item, locally, to obtain a locally stored, encrypted version of the video-on-demand, media content item;
sending, to a display device in response to a start time of the usage period, an offer for the video-on-demand, media content item in the particular format, the offer based on the offer information;
sending an acceptance notice to the server responsive to input indicating acceptance of the offer; and
receiving a decryption key from the server responsive to the acceptance notice, wherein the decryption key enables the processor to decrypt the locally stored, encrypted version of the video-on-demand, media content item for playback.

12. The system of claim 11, further comprising the display device.

13. The system of claim 11, wherein the operations further include freeing a storage space used to store the encrypted version for use to store other data in response to expiration of the usage period.

14. The system of claim 11, wherein the offer indicates that the video-on-demand, media content item has been downloaded.

15. The system of claim 11, wherein the offer includes an option for the video-on-demand, media content item in a second format different than the particular format, and wherein a first quality associated with the second format is lower than a second quality associated with the particular format.

16. A non-transitory, machine-readable storage device storing instructions executable by a processing system including a processor to cause a device to perform operations, the operations comprising:
receiving content from a server, the content including metadata and a first encrypted portion of an on-demand, media content item in a particular format, wherein the content is not received in response to a request for the on-demand, media content item, wherein the metadata indicates a usage period associated with the first encrypted portion and includes, offer information;
storing locally the entirety of the on-demand media content item comprising the first encrypted portion to obtain a locally stored, first encrypted portion;
sending an offer to acquire a playback right for the media content item to a display device in response to a start time of the usage period, the offer based on the offer information; and
responsive to input indicating acceptance of the offer:
sending an acceptance notice to the server;
receiving a decryption key from the server responsive to the acceptance notice;
sending a request for a second encrypted portion of the on-demand, media content item to a peer device via a peer-to-peer communication; and
receiving the second encryption portion of the on-demand, media content item from the peer device, wherein the processor is configured to combine the locally stored, first encrypted portion with the second encrypted portion and decrypt combined encrypted portions using the decryption key to enable playback of the on-demand, media content item.

17. The non-transitory, machine-readable storage device of claim 16, wherein the operations further comprise freeing a storage space used to store the first encrypted portion for use to store other data in response to expiration of the usage portion.

18. The non-transitory, machine-readable storage device of claim 16, wherein the on-demand, media content item comprises video-on-demand content.

19. The non-transitory, machine-readable storage device of claim 16, wherein the offer comprises an offer to rent the on-demand, media content item for a particular time period.

20. The non-transitory, machine-readable storage device of claim 16, wherein the metadata indicates that presentation of the offer is disabled until a start of the usage period.

* * * * *